(12) United States Patent
Smolarek

(10) Patent No.: US 7,261,506 B2
(45) Date of Patent: Aug. 28, 2007

(54) WASHER AND THREADED FASTENER ASSEMBLY INCORPORATING SAME

(76) Inventor: Hanna Maria Smolarek, 6 Auriol Court, Carine, WA 6020 (AU)

( * ) Notice: Subject to any disclaimer, the term of this patent is extended or adjusted under 35 U.S.C. 154(b) by 661 days.

(21) Appl. No.: 10/257,576

(22) PCT Filed: Mar. 9, 2001

(86) PCT No.: PCT/AU01/00255

§ 371 (c)(1),
(2), (4) Date: Sep. 9, 2002

(87) PCT Pub. No.: WO01/66964

PCT Pub. Date: Sep. 13, 2001

(65) Prior Publication Data

US 2003/0077143 A1 Apr. 24, 2003

(30) Foreign Application Priority Data

Mar. 9, 2000 (AU) .................... PQ6118

(51) Int. Cl.
*F16B 39/24* (2006.01)
*F16B 39/282* (2006.01)

(52) U.S. Cl. ................ 411/161; 411/114; 411/115; 411/145; 411/150; 411/187; 411/332

(58) Field of Classification Search ............ 411/161, 411/143–146, 164, 150, 187, 114, 115, 332, 411/943, 953
See application file for complete search history.

(56) References Cited

U.S. PATENT DOCUMENTS

| | | | | |
|---|---|---|---|---|
| 162,167 A * | 4/1875 | Holland | ............ | 411/136 |
| 184,040 A * | 11/1876 | Hall | ............ | 411/144 |
| 292,063 A * | 1/1884 | Shailer | ............ | 411/144 |
| 301,085 A * | 7/1884 | Brandon | ............ | 411/134 |
| 487,684 A * | 12/1892 | Robinson | ............ | 411/201 |
| 612,490 A * | 10/1898 | Durbin et al. | ............ | 411/331 |
| 752,628 A * | 2/1904 | Miner | ............ | 411/188 |
| 860,162 A * | 7/1907 | Townsend | ............ | 411/332 |
| 866,616 A * | 9/1907 | Bollwahn | ............ | 411/144 |
| 910,712 A * | 1/1909 | McCoy | ............ | 411/136 |
| 924,259 A * | 6/1909 | Mills | ............ | 411/143 |
| 1,031,579 A * | 7/1912 | Panalle | ............ | 411/331 |
| 1,047,064 A * | 12/1912 | Ivers | ............ | 411/197 |
| 1,159,131 A * | 11/1915 | Thompson | ............ | 411/136 |
| 1,166,736 A * | 1/1916 | Bailey | ............ | 411/331 |

(Continued)

*Primary Examiner*—Carlos Lugo
(74) *Attorney, Agent, or Firm*—Sughrue Mion, PLLC

(57) ABSTRACT

A washer for a threaded fastener assembly and a threaded fastener assembly incorporating such a washer. The washer includes a body having a central axis including two opposed sides an outer periphery and an inner periphery defining a central aperture extending between the two opposed sides. The body incorporates an engaging face for frictionally engaging a component of the threaded fastener assembly or a work-piece. A ramp structure extends angularly between the inner periphery and one side for interacting with a further component of the threaded fastener assembly to provide a mechanical connection therebetween for resisting unthreading of the threaded fastener assembly. The engaging face is associated with the other side and extends circumferentially about the central axis. The relative positions of the engaging face and the ramp structure with respect to the central axis is such that in use torque transferred through the engaging face is greater than torque acting through the ramp structure. With this arrangement, unwanted loosening of the threaded fastener assembly.

42 Claims, 10 Drawing Sheets

U.S. PATENT DOCUMENTS

| | | | | |
|---|---|---|---|---|
| 1,181,494 A * | 5/1916 | Warren et al. | | 411/114 |
| 1,254,726 A * | 1/1918 | Portee | | 411/317 |
| 1,303,784 A * | 5/1919 | Emery | | 411/143 |
| 1,379,473 A * | 5/1921 | Olmsted | | 411/246 |
| 1,406,423 A * | 2/1922 | Smith | | 411/143 |
| 1,459,818 A * | 6/1923 | Blankenship | | 411/145 |
| 1,527,915 A * | 2/1925 | Phelan | | 411/136 |
| 1,534,427 A * | 4/1925 | Tice | | 411/146 |
| 1,784,269 A * | 12/1930 | Clegg | | 411/331 |
| 2,034,494 A * | 3/1936 | Stoll | | 411/147 |
| 2,343,067 A * | 2/1944 | Luce | | 123/90.45 |
| 2,370,912 A * | 3/1945 | Pierce | | 411/161 |
| 2,619,146 A * | 11/1952 | Poupitch | | 411/134 |
| 2,681,678 A * | 6/1954 | Hage | | 411/134 |
| 3,077,218 A * | 2/1963 | Ziegler | | 411/155 |
| 3,221,792 A * | 12/1965 | Poupitch | | 411/134 |
| 3,241,589 A * | 3/1966 | Enders | | 411/136 |
| 3,332,464 A * | 7/1967 | Castel | | 411/155 |
| 3,803,972 A * | 4/1974 | Deutsher | | 411/337 |
| 4,377,361 A * | 3/1983 | Frieberg | | 411/161 |
| 4,433,879 A * | 2/1984 | Morris | | 384/626 |
| 5,011,351 A * | 4/1991 | Terry | | 411/144 |
| 5,190,423 A * | 3/1993 | Ewing | | 411/134 |
| 5,203,656 A * | 4/1993 | McKinlay | | 411/149 |
| 5,222,849 A * | 6/1993 | Walton | | 411/14 |
| 5,314,279 A * | 5/1994 | Ewing | | 411/134 |
| 5,409,338 A * | 4/1995 | McKinlay | | 411/149 |
| 5,626,449 A * | 5/1997 | McKinlay | | 411/149 |
| 5,688,091 A * | 11/1997 | McKinlay | | 411/149 |
| 5,829,933 A * | 11/1998 | Kramer | | 411/156 |
| 5,895,189 A * | 4/1999 | Ruckert | | 411/535 |
| 5,934,853 A * | 8/1999 | Junkers | | 411/432 |
| 6,227,782 B1 * | 5/2001 | Bowling et al. | | 411/114 |

* cited by examiner

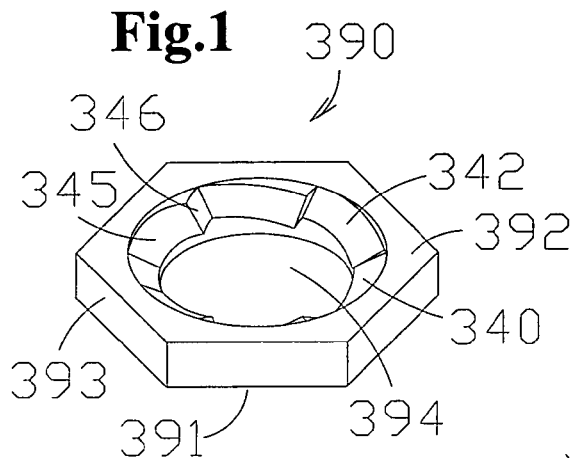
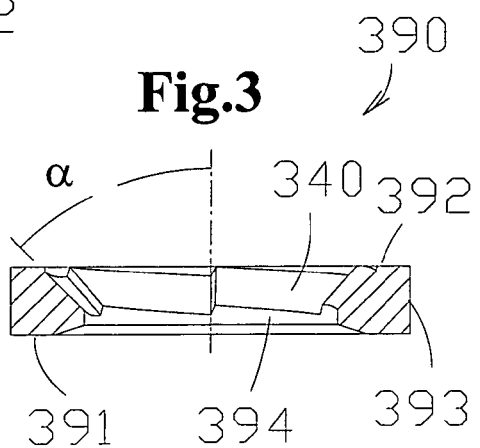
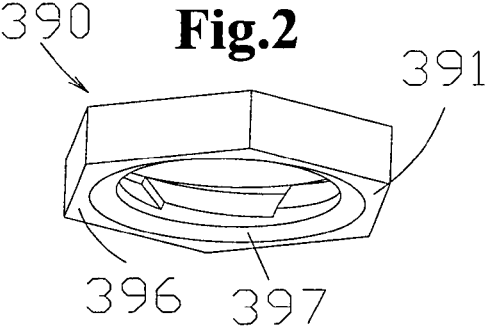
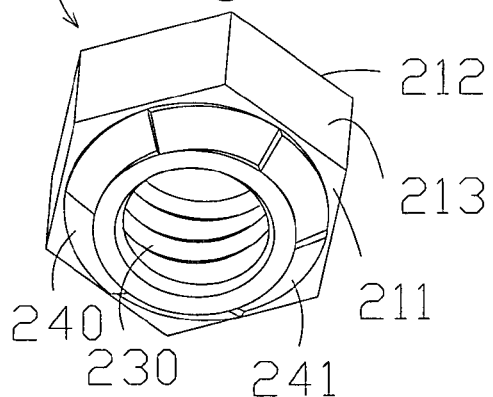
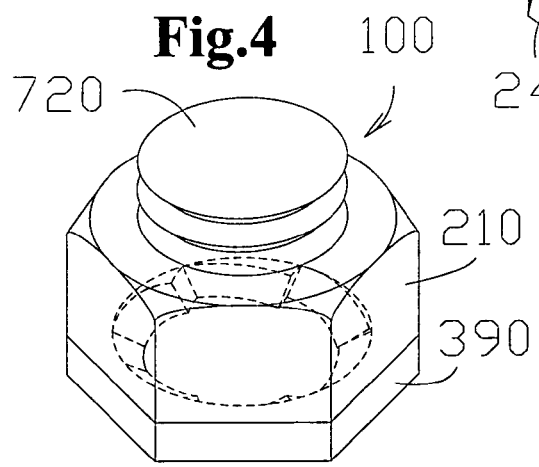

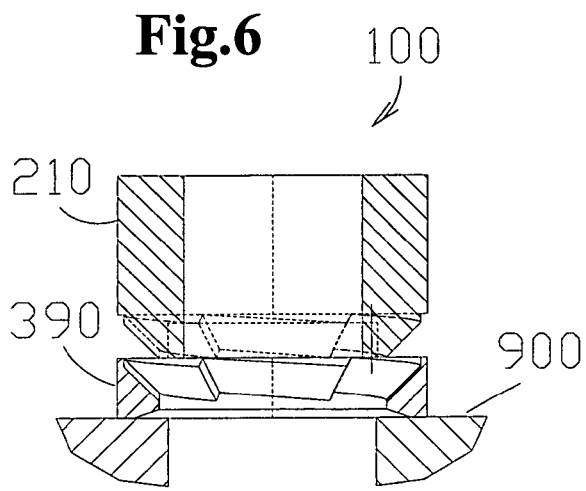
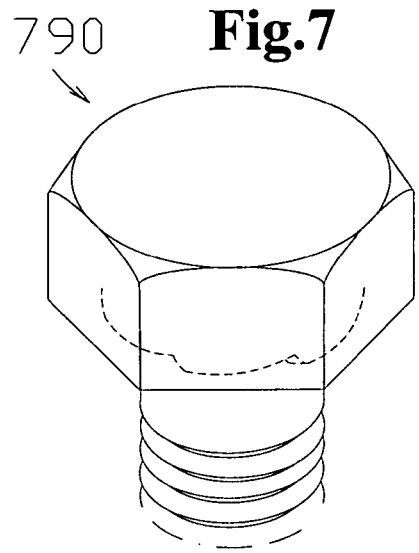
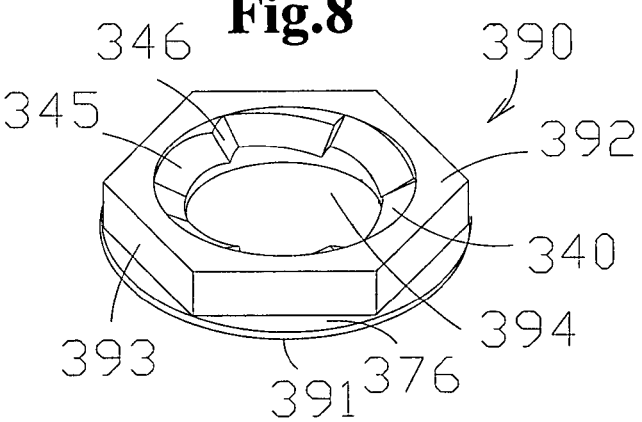
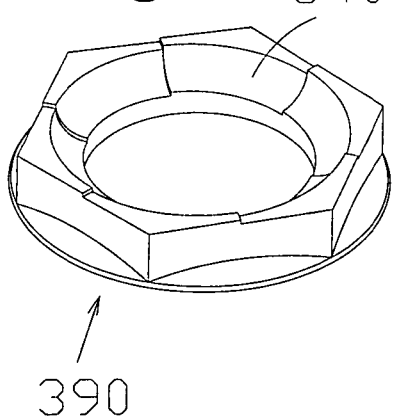
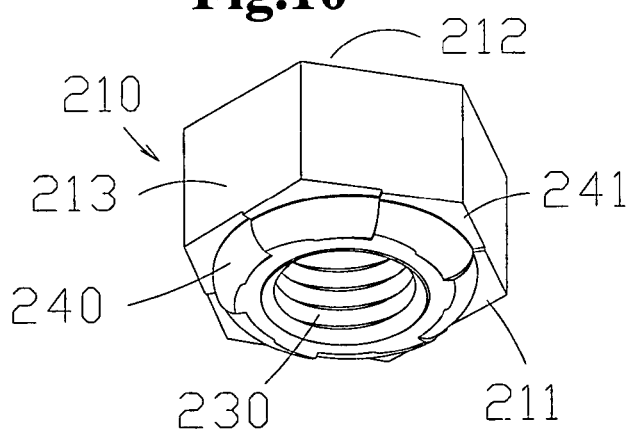

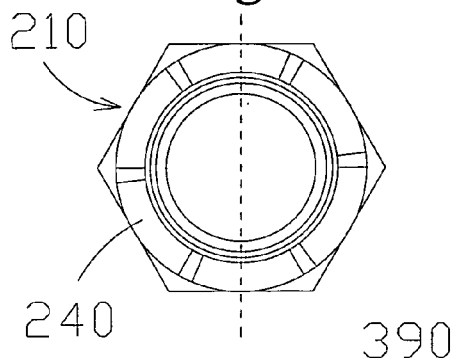
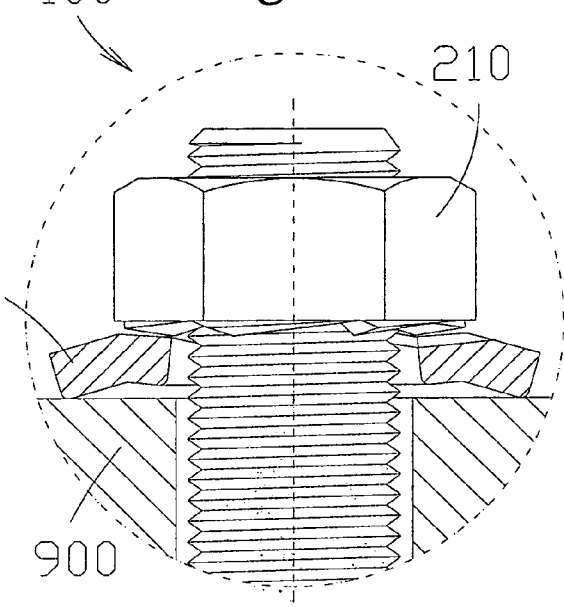
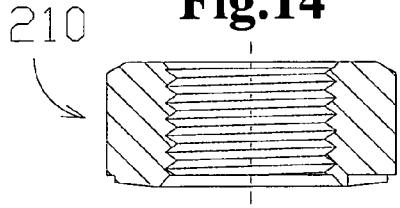
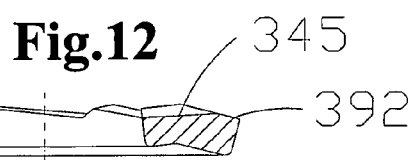
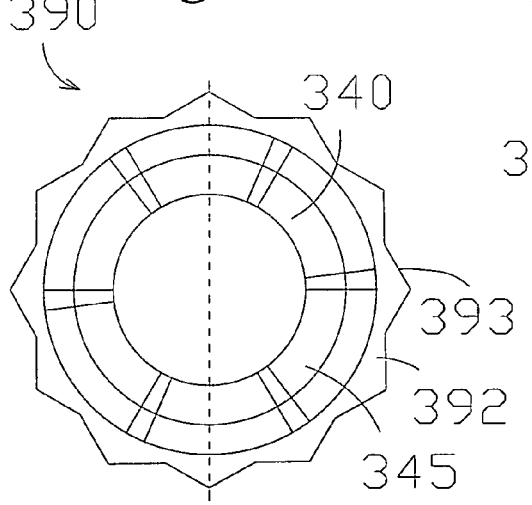
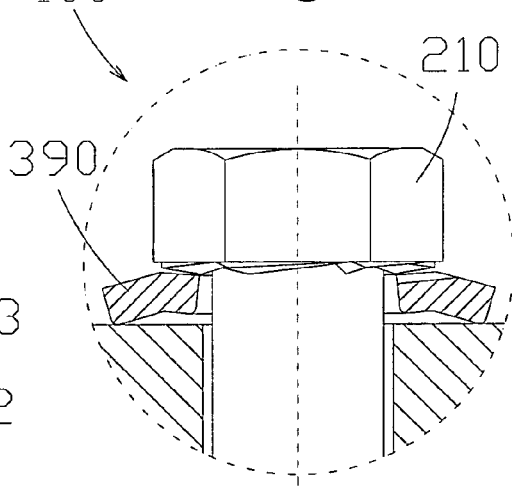

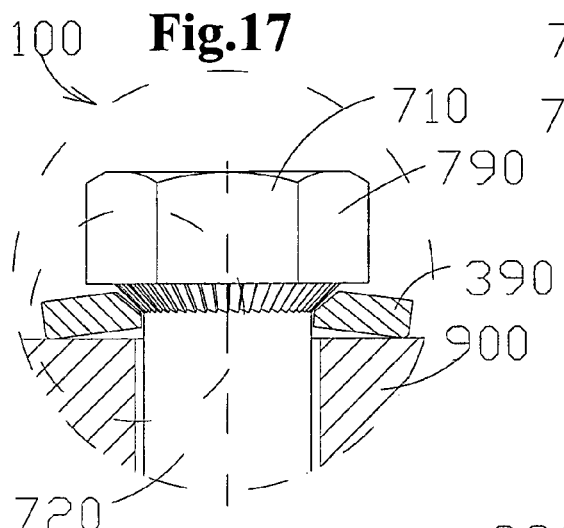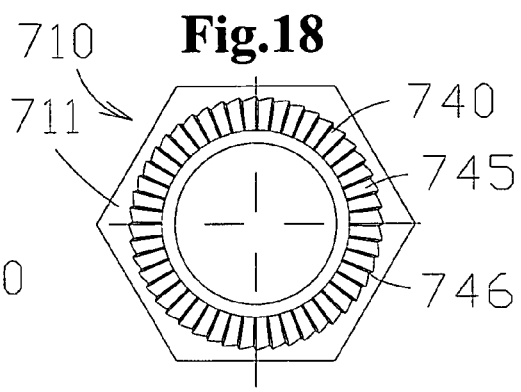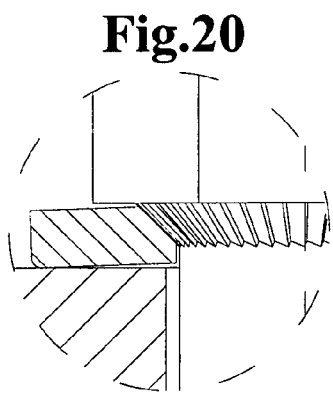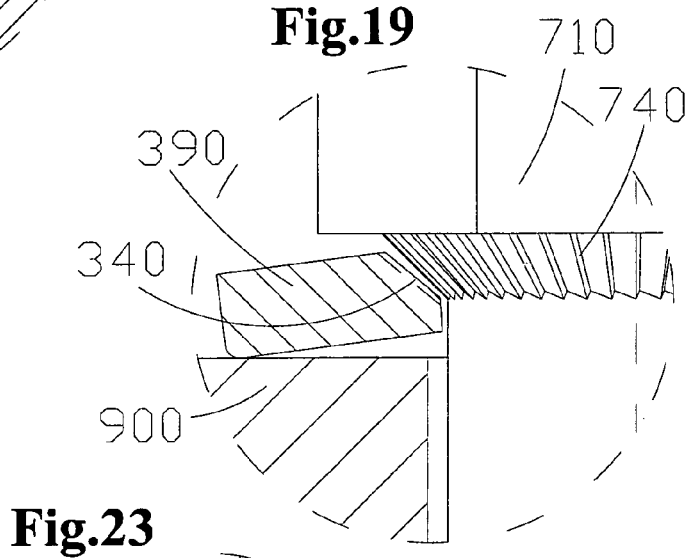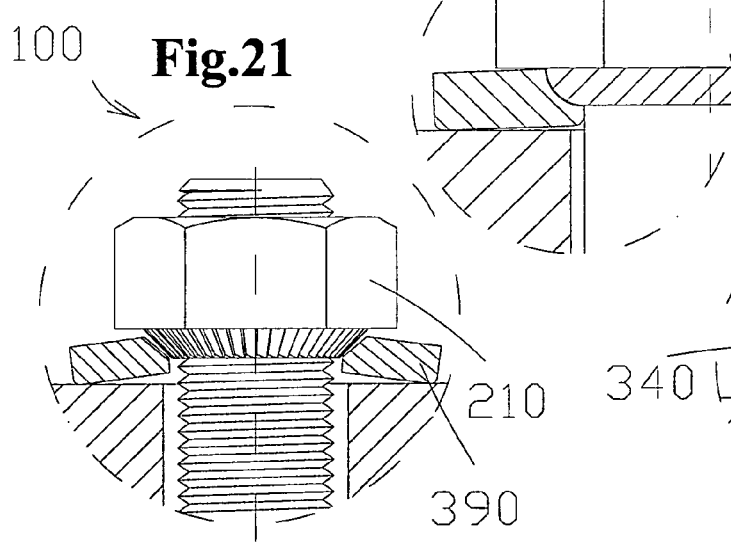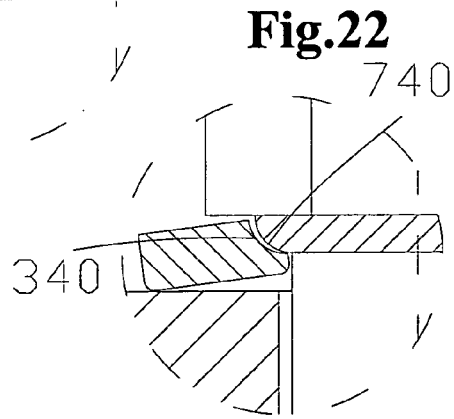

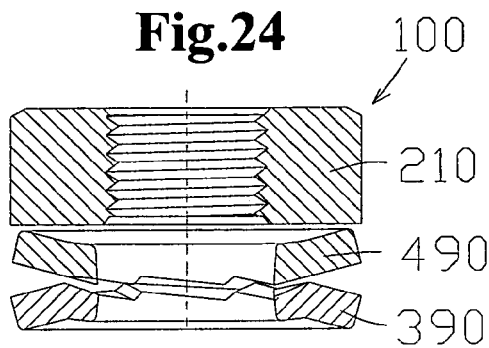
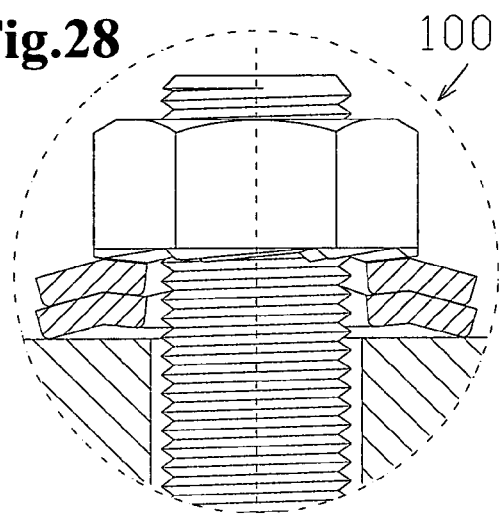
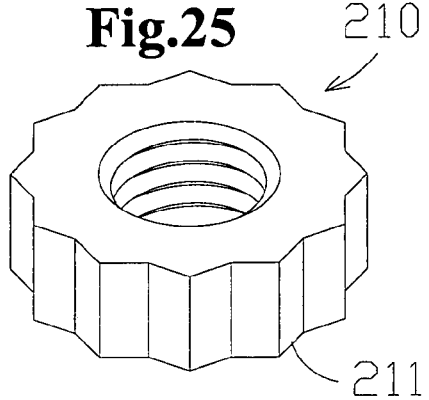
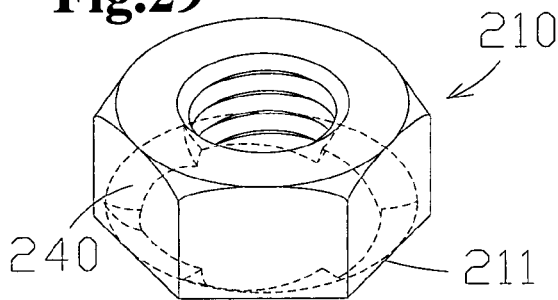
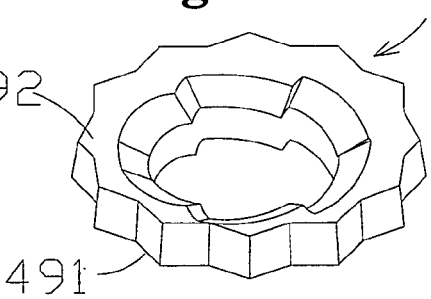
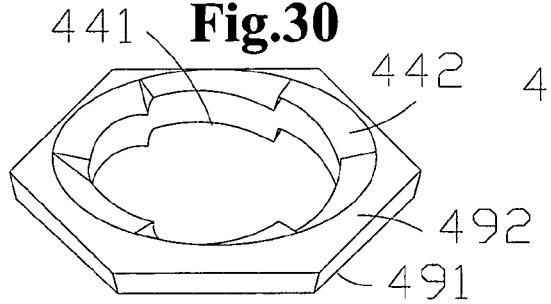
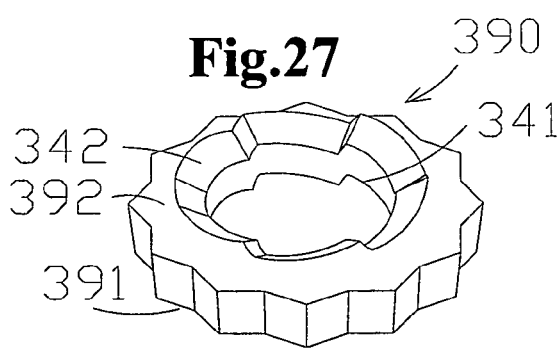
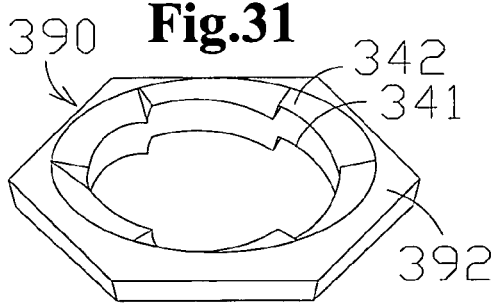

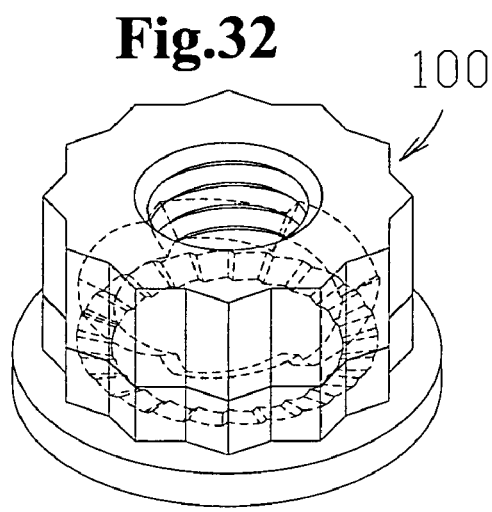
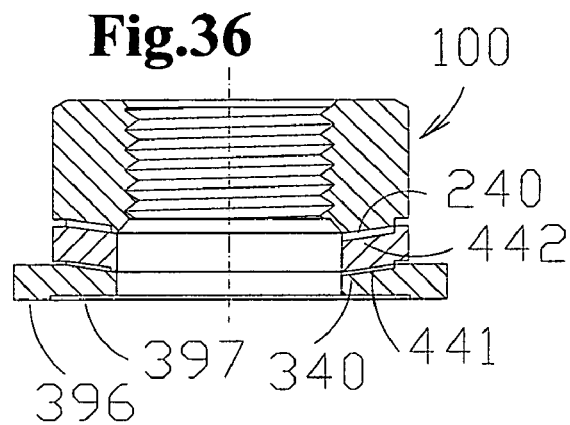
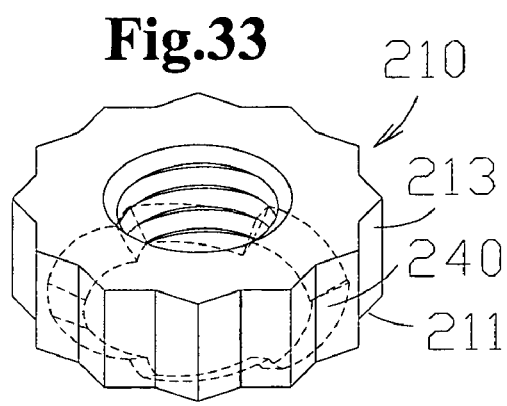
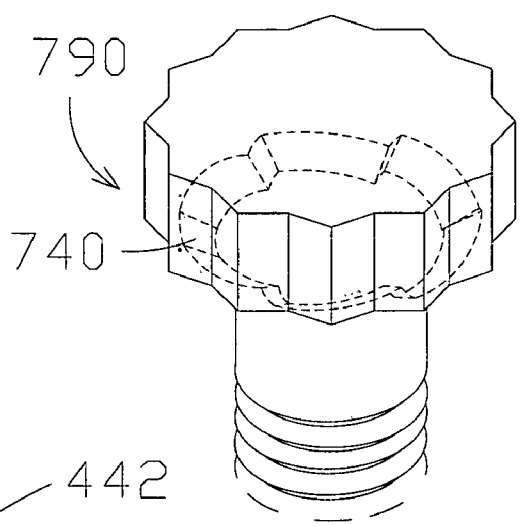
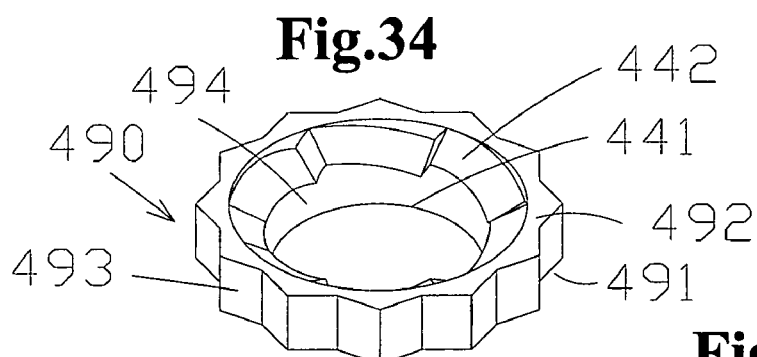
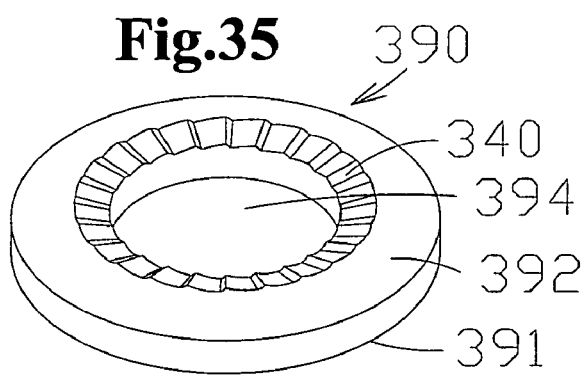
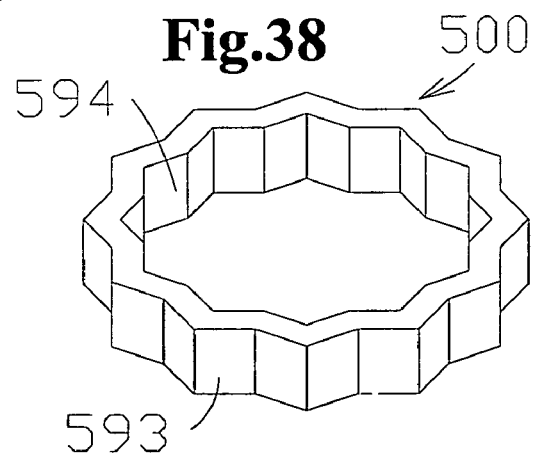

Fig.43 Fig.44 Fig.45
Fig.46 Fig.47 Fig.48
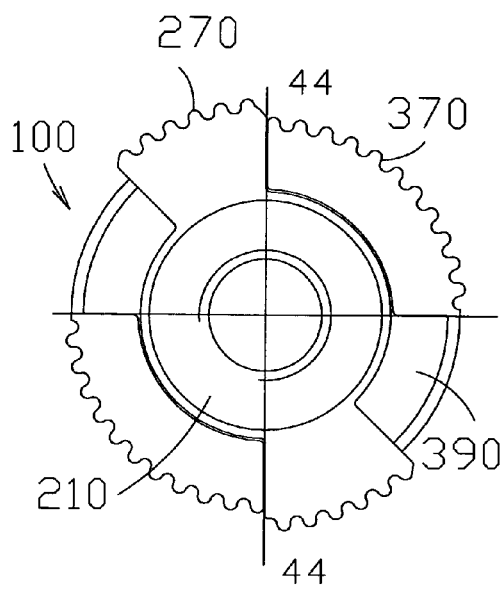
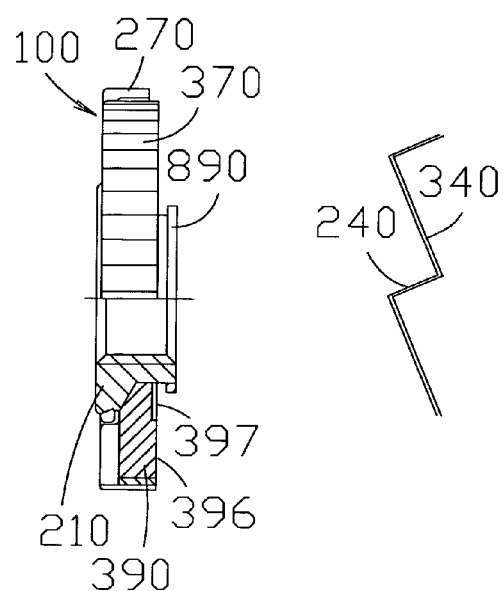
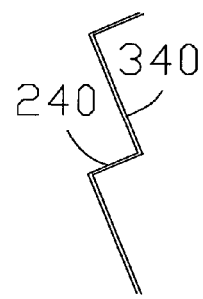
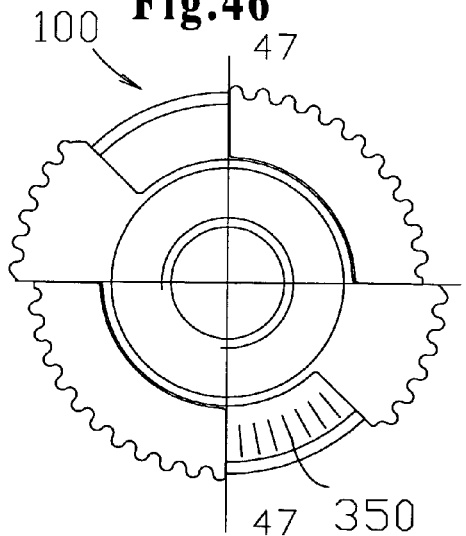
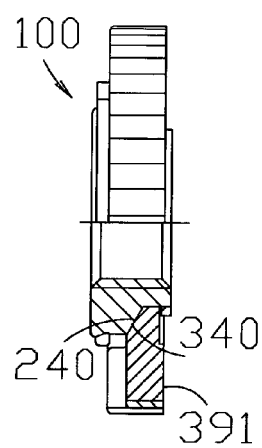
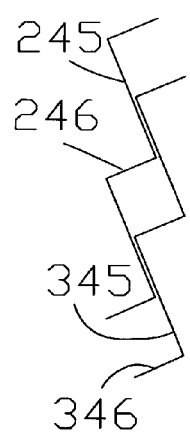

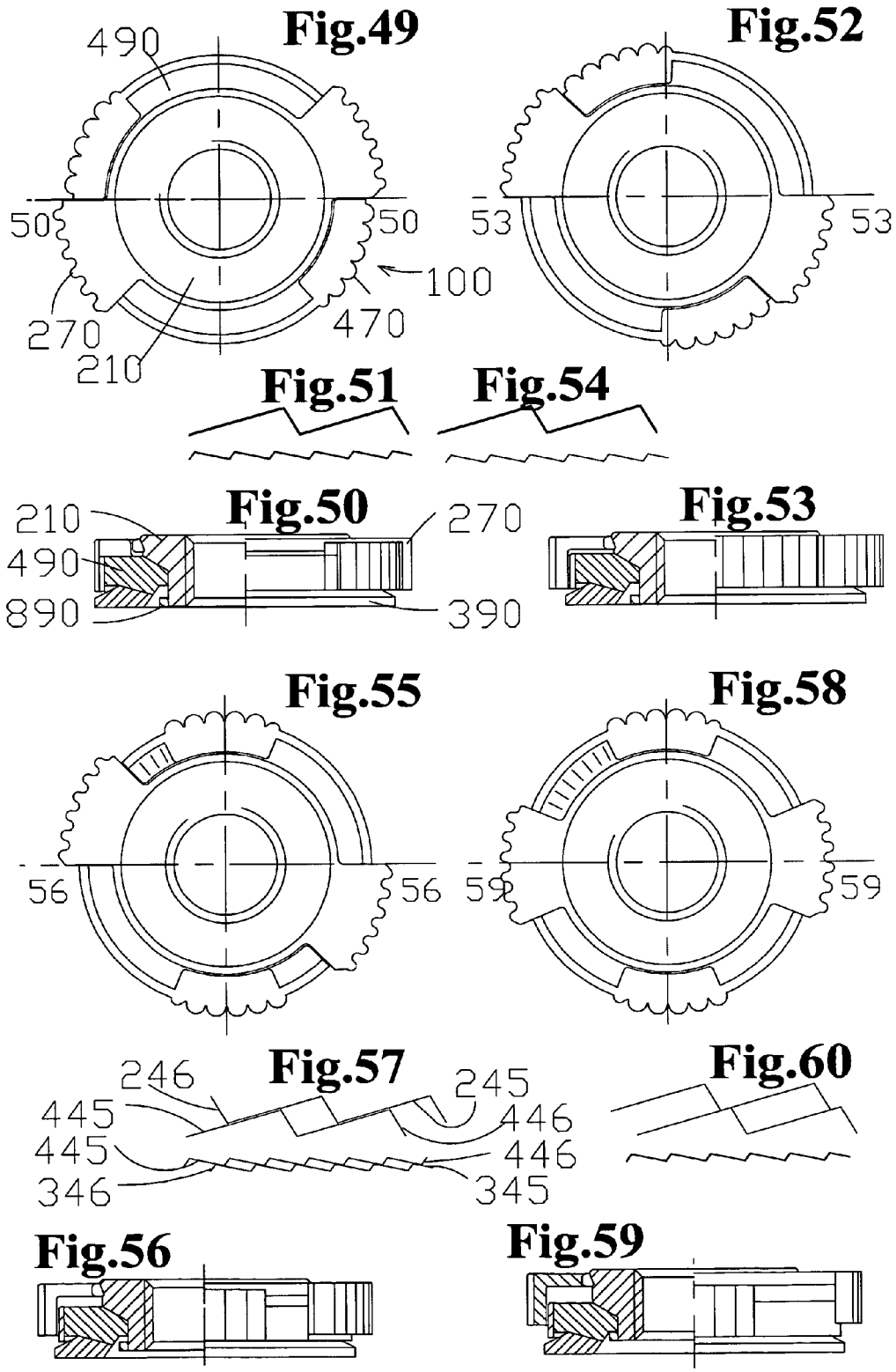

WASHER AND THREADED FASTENER ASSEMBLY INCORPORATING SAME

FIELD OF THE INVENTION

This invention relates to a washer for a threaded fastener assembly for securing a work-piece in position. The invention also relates to a threaded fastener assembly and in particular to a threaded fastener assembly that opposes unintentional off-torque. The term "off-torque" as used herein is intended to refer to torque applied to a threaded fastener assembly to loosen or unthread the assembly. The invention also concerns proper fastener preloading and the ability to maintain that load.

BACKGROUND OF THE INVENTION

Four major factors dramatically contribute to the failure of known threaded fasteners; namely: inappropriate preload; creep in all the components of the joint established by the threaded fastener; environmentally generated off-torque; and elevated and differential temperature.

Various designs have been proposed to solve these deficiencies, however failure of threaded joints continue to persistently occurs in almost every industry leading to loss of life, damage to equipment and other property including loss of product, production delays, and environmental disasters.

Wedge fasteners have been proposed in various forms to counteract a vibration or shock generated off-torque. Typically, such wedge fasteners utilise a washer to engage a surface of the work-piece with increased friction. However, the configuration of the washer can have the effect of damaging the work-piece surface with which it engaged, as well as causing accelerated creep at an increased magnitude and preventing accurate preloading. A design that operates without a frictional surface has been proposed in U.S. Pat. No. 4,793,752.

However, it requires an extensive flange for its operation. A design that employs ratchet teeth for easy preloading is disclosed in U.S. Pat. No. 4,034,788. It, however, requires the use of locking teeth that embed themselves into a work-piece.

A self-centring feature has been proposed for fasteners disclosure in U.S. Pat. No. 3,241,589, U.S. Pat. No. 3,926,237 and U.S. Pat. No. 4,283,091. Loading of the proposed fasteners is likely to be highly uncertain due to work-piece embedding teeth and linear contact between a washer and a threaded fastener.

In certain applications, it is important for fasteners to be loaded to a specified torque in order to ensure that a desired holding force is developed within the joint. Precision loading of a fastener to achieve a prescribed torque can be difficult to achieve. The most common method currently in practice, which has an accuracy of 25%, involves use of a torque wrench. Angle controlled tightening, which has a 15% accuracy, requires skilful labour to be properly applied. An example of such is disclosed in U.S. Pat. No. 5,165,831. The method bears some of the deficiencies of the torque wrench as it requires in its first step the application of a snug torque. 'Turn of the screw' method is disclosed in U.S. Pat. No. 3,851,386, involving finger tightening in the first step and alignment with predetermined position 'that looks and feels right' but which is less than elongation of failure. Although providing a highly satisfactory solution, a fastener incorporating a scale, such as the fastener disclosed in U.S. Pat. No. 5,411,008, is limited to the application on which it is employed.

Precision loading is particularly important where fasteners cooperate in a circular array. For securing wheels, a 'quarter turn' method is in common use where a quarter turn at a time is applied in a crisscross sequence. For flanges, several passes of a 'four point star' are often applied. More accurate loading can be achieved by the method disclosed in U.S. Pat. No. 5,278,775.

In relation to motor-aided applications, flange nuts mounted on a spindle of a power tool suffer thread profile permanent deformation when subject to high torque. The effect is particularly severe in tools of a larger diameter, such as cutting or grinding discs. Hand operated nuts that correct the problem have appeared recently on the market. A variety of designs have been proposed (for example as in U.S. Pat. No. 5,899,648), but component parts numbering usually in excess of 20 and complexity of manufacturing render such hand-operated nuts uneconomical for separate sale and they are usually sold as a part of a power tool.

It has been recently acknowledged that addition of a cone spring washer to the fastener assembly effectively counteracts creep. Various designs have been proposed, several examples of which can be seen in U.S. Pat. Nos. 5,547,326 and 5,597,279. None of the proposals, however, considers how such a washer aids off-torque after a certain amount of creep lifts the central portion off the work-piece.

It is against this background, and the problems and deficiencies associated therewith, that the present invention has been developed.

DISCLOSURE OF THE INVENTION

The present invention provides a washer for a threaded fastener assembly having an engaging zone at which a component of the assembly is subjected to frictional engagement without protrusions, the washer comprising a body having a central axis including two opposed sides, an outer periphery, an inner periphery defining a central aperture extending between the two opposed sides, a ramp structure for interaction with further components of the threaded fastener assembly to provide a mechanical connection therebetween for resisting unthreading of the threaded fastener assembly, the relative positions of the engaging zone and the ramp structure being such that in use torque transferred through the engaging zone is greater than torque acting through the ramp structure limiting or eliminating possible damage to the work-piece surface.

It is advantageous to form the washer in such a manner that the resultant vector of fastener forces transferred through the ramp structure is located closer to the central axis than the resultant vector of frictional forces acting through the engaging zone.

Typically, this is achieved by locating the ramp structure closer to the central axis than the engaging zone. The ramp structure and the engaging zone may be spaced along the radius from each other or there may be over-lapping therebetween.

The ramp structure may comprise a ramp profile incorporating wedge ramps or ratchet teeth.

The ramp structure may comprise a plurality of ramp sections each having a sloping ramp face and an abutment face. Each slopping face is preferably inclined with respect to a plane transverse to said central axis thereby to provide a self-centering action.

In a typical application, the ramp structure on the body of the washer would, in use, interact with a further ramp structure on another component within the threaded fastener assembly. The ramp structure on the body of the washer will hereinafter be referred to as the "base ramp structure" and the further ramp structure will hereinafter be referred to as the "mating ramp structure".

The base ramp structure and the mating ramp structure may each have a ramp profile adapted to interact with the other to resist unthreading of the threaded fastener assembly. The interacting ramp profiles can be of the same or similar mating configurations.

The further component of the threaded fastener assembly with which, in use, the base ramp structure interacts may comprise a threaded fastener, such as the head of a bolt, screw, or a nut, having a mating ramp structure, or a further washer constructed in accordance with the invention.

The washer may comprise an engaging face on one of the opposed sides or an outer edge of that side constructed for operation within the engaging zone of the fastener assembly. In a typical situation, the washer may be located against a work-piece in which case the engaging face frictionally engages the work-piece.

The washer may be a plane washer or a frusto-conical spring washer. Where the washer is a plain washer, one of the opposed sides may have a central recess surrounding the central aperture thereby to form the annular engaging face. Where the washer is a spring washer, the engaging face preferably comprises the outer edge of the spring washer.

The washer may be configured for engagement by a tool. Alternatively, the washer may incorporate a grip means to facilitate manual operation thereof.

The washer may, together with another component of the threaded fastener assembly, incorporate means for providing a visual indication of the extent of loading on the assembly.

Such means may comprise an indicator such as a pointer operating in association with a scale.

In a typical application, the indicator is provided on the threaded fastener. The scale may, for example, be provided on the work-piece or on an element (such as a washer) positioned between the work-piece and the threaded fastener. The scale may be permanently in position or provided on a temporary basis as may be required.

The washer may be the only washer used in the threaded fastener assembly or two or more washers may be used in the assembly. When there is more than one washer in the assembly a washer(s) may be provided with two ramp structures each associated with the opposed sides positioned for interaction with further ramp structures of other parts of the assembly. The location of any such ramp structure within the fastener assembly is such that in use a loading torque transferred through the engaging zone is greater than the loading torque acting through the ramp structure.

With this arrangement, the ramp structure of one washer interacts with the further rump structure of the other washer for wedging, ratcheting or resisting relative rotation between the two washers in a direction corresponding to unthreading of a threaded fastener assembly in which the two washers are installed. The intermediate washers of the assembly may include the engaging faces, although this is not always the case.

Where two or more spring washers are used in the threaded fastener assembly, they may be arranged in a series relationship, a parallel relationship, or a relationship in which the washers are arranged in a variety of series and parallel combinations.

The invention also provides a threaded fastener assembly incorporating a washer in accordance with the invention as defined above.

SUMMARY OF THE INVENTION

The present invention also provides a washer for a threaded fastener assembly comprising a body having a central axis including two opposed sides, an outer periphery, an inner periphery defining a central aperture extending between the two opposed sides, an engaging face, without protrusions, for frictionally engaging a component of the threaded fastener assembly or a work-piece, a ramp structure disposed between the inner periphery and one of the opposed sides for interacting with a further component of the threaded fastener assembly to provide a mechanical connection therebetween for resisting unthreading of the threaded fastener assembly, the engaging face being associated with the other of the opposed sides and extending circumferentially about the central axis, the relative positions of the engaging face and the ramp structure with respect to the central axis being such that in use torque transferred through the engaging face is greater than torque acting through the ramp structure.

With the arrangement, the resultant vector of fastener loading forces transferred through the ramp structure is located closer to the central axes than the resultant vector of frictional forces acting through the engaging face.

Typically, the relative positions are such that the ramp structure is positioned closer to the central axis than the engaging face. The ramp structure and the engaging face may be radially spaced from each other or there may be some over lapping there between.

The engaging face may be on said other of the opposed sides or an outer edge of that side.

The ramp structure may comprise a ramp profile incorporating wedge ramps or ratchet teeth.

The ramp structure may comprise a plurality of ramp sections each having a sloping ramp face and an abutment face. Each slopping face is preferably inclined with respect to a plane transverse to said central axis thereby to provide a self-centering action.

The washer may be a plane washer or a frusto-conical spring washer. Where the washer is a plain washer, said other face may have a central recess surrounding the central aperture thereby to form the annular engaging face. Where the washer is a spring washer, the engaging face preferably comprises the outer edge of the spring washer.

The washer may be configured for engagement by a tool. Alternatively, the washer may incorporate a grip means to facilitate manual operation thereof.

The washer may, together with another component of the threaded fastener assembly, incorporate means for providing a visual indication of the extent of loading on the assembly.

The washer in accordance with the invention may be the only washer used in the threaded fastener assembly, or two or more such washers may be used in the assembly. When there is more than one washer in the assembly, a washer or washers may be provided with two ramp structures each associated with the opposed sides positioned for interaction with further ramp structures of other parts of the assembly. The location of any such ramp structure within the fastener assembly is such that in use a loading torque transferred through the engaging zone is greater than the loading torque acting through the ramp structure.

With this arrangement, the ramp structure of one washer interacts with the further rump structure of the other washer for wedging, ratcheting or resisting relative rotation between the two washers in a direction corresponding to unthreading of a threaded fastener assembly in which the two washers are installed. The intermediate washers of the assembly may include the engaging faces, although this is not always the case.

Where two or more spring washers are used in the threaded fastener assembly, they may be arranged in a series relationship, a parallel relationship, or a relationship in which the washers are arranged in a variety of series and parallel combinations.

The washer may be provided with a further ramp structure associated with the other of the opposed sides, the further ramp structure being so positioned for interaction with the ramp structure of a second washer which is in accordance with the invention and with which it is assembled in a parallel configuration. With this arrangement, two washers can be assembled in a parallel configuration, with the ramp structure of one washer interacting with the further ramp structure of the other washer for resisting relative rotation between the two washers in a direction corresponding to unthreading of a threaded fastener assembly in which the two washers are installed. Indeed, the further ramp structure is necessary in circumstances where washers are to be arranged in a parallel relationship for otherwise there would be undesired movement between the mating washers.

The present invention also provides a threaded fastener assembly incorporating a washer in accordance with the invention as hereinbefore defined.

The present invention further provides a threaded fastener assembly for releasably securing a work-piece in position, the threaded fastener assembly comprising a threaded fastener having an axis of rotation, a washer presenting an annular engaging face concentric with said axis of rotation for frictionally engaging the work-piece, and means providing a mechanical connection between the threaded fastener and the washer for resisting unthreading of the threaded fastener, said means including a ramp structure on the threaded fastener, the ramp structure being positioned closer to the axis of rotation of the threaded fastener than the annular engaging face of the washer.

With this arrangement, the engaging face of the washer is disposed radially further from said axis of rotation of the threaded fastener than the mechanical connection between the threaded fastener and the washer. In this way, lower frictional torque is established at the mechanical connection between the threaded fastener and the washer than exists between the washer and the work-piece which is frictionally engaged by the washer.

Although not limited thereto, the threaded fastener typically comprises a nut, bolt or screw.

In one arrangement, the mechanical connection between the threaded fastener and the washer may be established between the threaded fastener and the washer.

In another arrangement, the means providing a mechanical connection between the threaded fastener and the washer may include an intermediate member adapted to be positioned between the threaded fastener and the washer, the intermediate member being mechanically connected to both the threaded fastener and the washer.

The present invention also provides a threaded fastener assembly for releasably securing a work-piece in position, the threaded fastener assembly comprising a threaded fastener having an axis of rotation, a washer presenting an annular engaging face concentric with said axis of rotation for frictionally engaging the work piece, and means providing a mechanical connection between the threaded fastener and the washer for resisting unthreading of the threaded fastener, said means having co-acting surfaces which are inclined with respect to a plane extending radially with respect to said axis of rotation.

A threaded fastener assembly in accordance with the invention may further comprise a means for providing a visual indication of the extent of loading on the assembly. Such means may comprise an indicator such as a pointer operating in association with a scale. In a typical application, the indicator is provided on the threaded fastener. The scale may, for example, be provided on the work-piece or on an element (such as a washer) positioned between the work-piece and the threaded fastener. The scale may be permanently in position or separately provided for attachment during joint installation as may be required. Similarly the scale can be on a threaded fastener and a pointer on a washer or work-piece.

Once the washer contacts the work-piece, the indicator is aligned with the beginning of the scale. A torque-imposing tool can then be used to load the assembly according to the scale.

BRIEF DESCRIPTION OF THE DRAWINGS

With a substantial number of optional features of this invention a great number of embodiments can be constructed. The invention will be better understood by reference to the following description of a number of such embodiments. The description will be made with reference to the accompanying drawings in which:

FIG. 1 is a perspective view of a washer according to a first embodiment;

FIG. 2 is an underside perspective view of the washer;

FIG. 3 is a cross-section of the washer;

FIG. 4 is a perspective view of a threaded fastener assembly that incorporates the washer of the first embodiment;

FIG. 5 is an underside perspective view of a nut forming part of the threaded fastener assembly of FIG. 4;

FIG. 6 is a sectional view of the threaded fastener assembly in association with a work-piece;

FIG. 7 is a perspective view of a bolt that can be substituted for the nut in the threaded fastener assembly;

FIG. 8 is a perspective view of a variant of the washer according to the first embodiment;

FIG. 9 is a perspective view of a further variant of the washer according to the first embodiment;

FIG. 10 is an underside perspective view of a nut for use with the washer of FIG. 9;

FIG. 11 is a fragmentary sectional view of a threaded fastener assembly with a washer according to a second embodiment;

FIG. 12 is a cross-sectional view of the washer of the second embodiment;

FIG. 13 is a plan view of the washer;

FIG. 14 is a sectional view of a nut forming part of the threaded fastener assembly of FIG. 11;

FIG. 15 is a plan view of the nut shown on FIG. 14;

FIG. 16 is a fragmentary sectional view of an alternative threaded fastener assembly incorporating the washer of the second embodiment;

FIG. 17 is a fragmentary sectional view of a threaded fastener assembly accommodating a washer according to a third embodiment;

FIG. 18 is an underside view of the head of a bolt forming part of the thread fastener assembly of FIG. 17;

FIG. 19 is a detailed section of the assembly of FIG. 17;

FIG. 20 is a section similar to FIG. 19 except that the threaded fastener assembly is shown in a fully loaded condition;

FIG. 21 is a fragmentary sectional view of an alternative threaded fastener assembly incorporating the washer of the third embodiment;

FIG. 22 is a detailed section of a threaded fastener assembly with a washer according to a fourth embodiment;

FIG. 23 is a section similar to FIG. 22 except that the threaded fastener assembly is shown in a fully loaded condition;

FIG. 24 is a section through an assembly with two washers according to a fifth embodiment;

FIG. 25 is a perspective view of a nut forming part of the assembly of FIG. 24;

FIG. 26 is a perspective view of an intermediate washer forming part of the assembly of FIG. 24;

FIG. 27 is a perspective view of a retainer washer forming part of the assembly of FIG. 24;

FIG. 28 is a fragmentary section through a threaded fastener assembly incorporating two washers of a sixth embodiment;

FIG. 29 is a perspective view of a nut forming part of the threaded fastener assembly shown in FIG. 28;

FIG. 30 is a perspective view of an intermediate washer forming part of the assembly shown in FIG. 28;

FIG. 31 is a perspective view of the retainer washer forming part of the assembly shown in FIG. 28;

FIG. 32 is a perspective view of a threaded fastener assembly with two washers;

FIG. 33 is a perspective view of a nut forming part of a threaded fastener assembly of FIG. 32;

FIG. 34 is a perspective view of the washer employed in the threaded fastener assembly of FIG. 32;

FIG. 35 is a perspective view of a further washer employed in the threaded fastener assembly of FIG. 32;

FIG. 36 is a section through an assembly of FIG. 32;

FIG. 37 is a perspective view of a bolt that can be used as an alternative of the nut in the assembly of FIG. 32;

FIG. 38 is a perspective view of a size adaptor;

FIG. 43 is a plan view of threaded fastener assembly that includes a washer according to a further embodiment, the assembly being shown in a first position;

FIG. 44 is a section along the line 44—44 of FIG. 43;

FIG. 45 is a schematic view showing the relative position of ramps within the threaded fastener assembly when in the first position;

FIG. 46 is a view similar to FIG. 43 with the exception that the threaded fastener assembly is shown in a second position;

FIG. 47 is a section along the line 47—47 on FIG. 46;

FIG. 48 is a schematic view showing the relative position of ramps within the threaded fastener assembly when in the second position;

FIG. 49 is a plan view of a threaded assembly employing an intermediate washer and a retainer washer, with the assembly being shown in a first position;

FIG. 50 is a section along the line 50—50 of FIG. 49;

FIG. 51 is a schematic view showing the relative position of ramps within threaded fastener assembly when in the first position;

FIG. 52 is a view similar to FIG. 49 with the exception that the threaded fastener assembly is shown in a second position;

FIG. 53 is a section along the line 53—53 on FIG. 52;

FIG. 54 is a schematic view showing the relative position of ramps within the threaded fastener assembly when in the second position;

FIG. 55 is a view similar to FIG. 49 with the exception that the threaded fastener assembly is shown in a third position;

FIG. 56 is a section along the line 56—56 of FIG. 55;

FIG. 57 is a schematic view showing the relative position of ramps within the threaded fastener assembly when in the third operational position;

FIG. 58 is a view similar to FIG. 49 with the exception that the threaded fastener assembly is shown in a fourth operational position;

FIG. 59 is a section along the line 59—59 on FIG. 58;

FIG. 60 is a schematic view showing the relative position of ramps within the threaded fastener assembly when in the fourth operational position;

BEST MODE(S) FOR CARRYING OUT THE INVENTION

Figure 39:
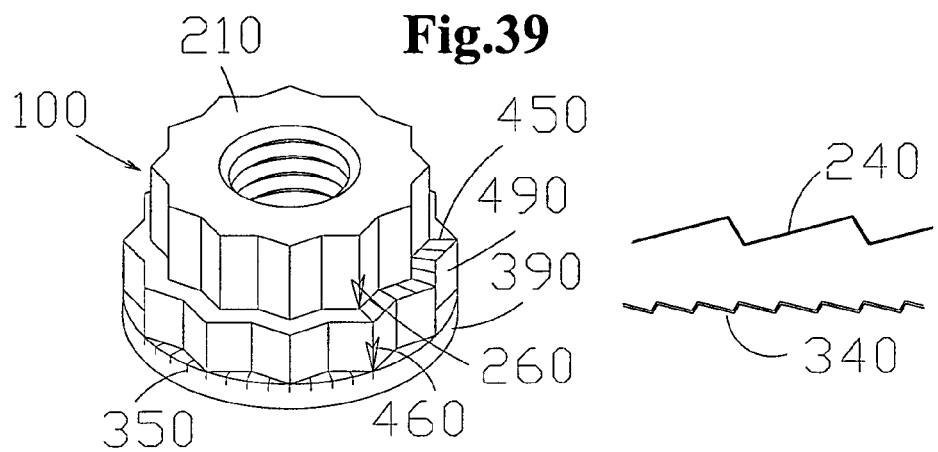
FIG. 39 is a perspective view of a threaded fastener assembly employing an intermediate washer and a retainer washer, the threaded fastener assembly being shown in a first operational position.
Figure 40:
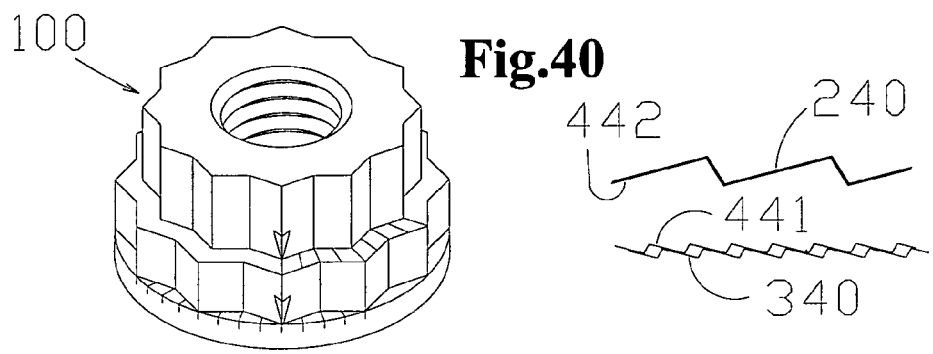
FIG. 40 is a perspective view of the threaded fastener assembly of FIG. 39 in a second operational position.

Referring now to FIGS. 1 to 6 of the accompanying drawings, there is shown a threaded fastener assembly 100 incorporating a washer 390 according to a first embodiment. The washer 390 is situated to retain a work-piece 400 in position and hence it will be referred to as a retainer washer.

The threaded fastener assembly 100 comprises a bolt having a threaded shank 220, a threaded fastener 210 in the form of a nut, and the retainer washer 390. The nut 210 has a thread 230, an inner face 211, an outer face 212 and an outer periphery 213 of hexagonal configuration. The thread 230 is illustrated as a conventional right-hand thread but it will be understood that a left-hand thread could alternatively be used. The inner face 211 of the nut 210 is provided with an annular ramp structure 240.

The retainer washer 390 is in the form of a plain washer having an outer periphery 393 extending between an outer face 392 and an inner face 391. The outer periphery 393 is of a hexagonal configuration of corresponding shape and dimension to the hexagonal configuration of the nut 210.

The retainer washer 390 is formed of a material of hardness preferably slightly greater than that of the nut 210. The retainer washer 390 has an inner periphery defining a central aperture 394 through which the shank 220 of the bolt can extend.

An annular ramp structure 340 is formed angularly in the retainer washer 390, extending between the central aperture 394 and the outer face 392, as best seen in FIG. 3. With this arrangement, the ramp structure 340 is frusto-conical so as to be somewhat dish-shaped. The protruding ramp structure 240 of the nut 210 is of complimentary configuration to the ramp structure 340 on the washer 390, as best seen in FIG. 5.

The dished ramp structure 340 and the protruding mating ramp structure 240 each comprise a plurality of wedge ramp sections each having a sloping face 345 and an abutment face 346, as best seen in FIG. 1 of the drawings. The sloping faces 345 are inclined in the same general direction as the thread 230 on the nut 210 at such an appropriate angle, preferably slightly smaller than the thread lead angle, as to cause net actual loading during unthreading of the nut.

In addition to sloping between adjacent abutment faces 346, the ramp sections on both the ramp structure 240 and ramp structure 340 are inclined in the radial direction with respect to the axis of rotation of the bolt. With this arrangement, the faces 345 of the ramp structure 340 formed in the retainer washer 390 slope along the radius inwardly away from the outer face 392 and form an acute angle α with the axis, as best seen in FIG. 3. In other words, the ramp faces are inclined with respect to a plane extending along the radius with respect to the central axis of the fastener assembly. The angular configuration of the sloping faces 245, 345 provides conical contact surfaces 242, 341 between the nut 210 and the retainer washer 390 respectively, making a conical force transfer surface between the nut 210 and the retainer washer 390. This inclination provides the threaded fastener assembly with a self-centering action and eliminates hoop spreading, which is a particular problem with some prior art fasteners. The dished and protruding shape of the ramp structures 240, 340 shifts resultant of forces transferred closer to the centre than ramp structures situated on outer surface of a washer and therefore allows more compact design than other known fasteners using differential torque to resist unwanted loosening.

The inner face 391 of the retainer washer 390 has an undercut section, which provides a central recess 397 surrounded by an engaging face 396 for engagement against the work-piece 900. The radius at which the recess 397 ends and the engaging face 396 begins is chosen taking into consideration frictional coefficients of abutting surfaces of the washer 390 and the work-piece, and friction between the washer 390 and the nut 210 on their mating ramp sections, ramp as well as the lead angle of the ramp sections along their travel. In effect, lower frictional torque is established at the inter-engagement between the nut 210 and the retainer washer 390 than exists at the engaging face 396 with the work-piece. With the retainer washer 390 positioned on the shank 220 of a bolt to form the threaded fastener assembly 100 as shown in FIGS. 4 and 6, the ramp structure 240 on the nut 210 interacts with the ramp structure 340 on the retainer washer 390, with the ramp faces of the respective ramp structures 240, 340 in mating relationship. Engagement between the nut 210 and the retainer washer 390 is achieved solely by interaction between the ramp structures 240 and 340.

With this arrangement, once the nut 210 has been threaded on the bolt shank 220 and tightened such that the ramp faces are in a mating condition, any rotation of the nut 210 in the unthreading (loosening) direction will cause relative movement between mating ramp faces which will induce a wedge action that jams the thread 230 of the nut 210 on the thread of the bolt shank 220. Not only does this action serve to lock the nut 210 against loosening, it also serves a self-tightening function.

The presence of the engaging face 396 is advantageous in that it allows a wedging action with work-piece engagement through a flat surface without work-piece embedding protrusions commonly used in prior art fasteners.

The threaded fastener assembly 100 described and illustrated in FIGS. 4 and 6 utilised a threaded fastener 210 in the form of a nut. The threaded fastener 210 could equally be in the form of a bolt 290 with the ramp structure 240 provided on the head of the bolt, as shown in FIG. 7.

FIG. 8 illustrates a variant of the washer 390 of the first embodiment. The variant is of similar construction to the washer 390, except that it incorporates a flange portion 376 providing an extended engaging face for engagement against a work-piece.

FIG. 9 illustrates another variant of the washer 390 of the first embodiment and FIG. 10 illustrates a corresponding variant to the nut 290. In the first embodiment, the ramp sections on the ramp structure 340 of the washer 390 and the complementary ramp structures 240 on the nut 210 presented conical contact surfaces. In the variant illustrated in FIG. 9, the contact surface 341 presented by the ramp structure 340 is arcuate or spherical in the sense that it corresponds to part of the surface of a sphere. The contact surface 242 presented by the corresponding nut 210 is also arcuate or spherical.

Where the contact surfaces 242, 341 have been described as frusto-conical in the first embodiment and arcuate or spherical in the variant thereto, it should be appreciated that they may be of any other appropriate shape including variations of cones and spheres.

Referring now to FIGS. 11 to 15, there is shown a threaded fastener assembly 100 incorporating a washer 390 according to a second embodiment. The washer 390 is in engagement with a work-piece 900. The threaded fastener assembly utilised a threaded fastener 210 in the form of a nut. The nut 210 incorporates an engaging ramp structure 240 formed integrally therewith, similar to the embodiment previously described. The retainer washer 390 is in the form of a frusto-conical spring rather than a plain washer as described in the previous embodiment. The spring washer 390 can be made of any commonly spring material. The spring material is normally of greater hardness than that of the bolt or nut. The retainer washer 390 incorporates a ramp structure 340, which interacts with the ramp structure 240 formed on the nut 210 in a manner described in relation to the earlier embodiment. As best seen in FIG. 12, the ramp structure 340, and in particular the sloping faces 345 thereof are inclined (skewed) along the radius inwardly away from the outer face 392. With this embodiment, it is important to ensure that the frusto-conical spring is not loaded to an extent that it is fully deflected, but rather the deflection should reach about 75% of full deflection at the required pre-load condition.

As best seen in FIG. 13, the retainer washer 390 of this embodiment has an outer radial periphery 393 configured for engagement with a tool such as a wrench.

As can be seen in FIG. 11, the ramp structures 240, 340 are arranged to initially engage each other at location (which is along the radius inner ends of the ramp structures) as the nut 210 is threaded onto the bolt. As the nut 210 is tightened, and the retainer washer 390 resiliently deflects under loading, the engagement between the ramp structures 240, 340 progressively increases in the outward direction until full engagement is achieved.

FIG. 16 illustrates a variant of the threaded fastener assembly 100 where the threaded fastener 210 is in the form of a bolt.

Referring now to FIGS. 17 to 20, there is shown a threaded fastener assembly 100 incorporating a retainer washer 390 according to a third embodiment. The retainer washer 390 according to this embodiment is somewhat similar to the washer 390 of the previous embodiment in that it also uses a frusto-conical spring. However, the mechanical connection provided between the bolt 210 and the retainer washer 390 is not by way of interacting wedge ramps, as was the case with previous embodiments, but rather by way of interacting ratchet teeth. More particularly, in this embodiment the threaded fastener 790 is in the form of a bolt provided with a ramp structure 740 comprising ratchet teeth on a boss portion formed at the junction between the bolt head 710 and bolt shank 720. The ramp structure 740 is adapted to interact with complimentary ramp structure 340 provided on retainer washer 390, the ramp structure 340 also comprising ratchet teeth. A rounded engaging face 397 is formed on the edge of the retainer washer 390 where it contacts the work-piece 900 to avoid damage to the work-piece.

The initial engagement between dished and protruding ramp structures 240, 340 can cause immediate alignment of their surfaces. The ratchet teeth of ramp structures 240, 340 are arranged to initially engage each other at a location along the radially inner ends of the two ramp structures, as shown in FIG. 19. As the nut 210 is tightened and the retainer washer 390 resiliently deflects under loading, the engagement between the ramp structures 240, 340 progressively increases until full engagement is achieved, as illustrated in FIG. 20.

In the threaded fastener assembly 100 of this embodiment, the threaded fastener 210 is a bolt. In a variant illustrated in FIG. 21, the threaded fastener 210 is a nut.

FIGS. 22 and 23 illustrate a threaded fastener assembly 100 incorporating a retainer washer 390 having an alternative configuration of ratchet teeth. In this embodiment the teeth of ramp structure 340 are of arcuate or spherical shape, rather than conical shape, as also are the teeth of the complementary ramp structure 740 on the threaded fastener 790. It should, however, be understood that the ratchet teeth can be of any appropriate complimentary configuration.

As can be seen from FIG. 22, the two ramp structures 740, 340 initially engage each other at a location adjacent their radially inner ends. As the threaded fastener 790 is tightened and the retainer washer 390 resiliently deflects under loading, engagement between the ramp structures 740, 340 progressively increases until full engagement is achieved, as illustrated in FIG. 23.

Washers according to the previous embodiments have been incorporated into bolted assemblies 100 which used ramp structure interaction of two components; namely, a threaded fastener 210 (being either a bolt or a nut) and the retainer washer 390 incorporated therein. There are situations in certain applications where it is advantageous to introduce a third component, (or indeed still more components) into the threaded fastener assembly.

One such arrangement is illustrated in FIGS. 24 to 27 involving a threaded fastener assembly 100 incorporating two wedge ramp washers 390, 490 in accordance with a fifth embodiment. Two sets of ramps (protruding and dished) are formed in parallel adjacent inner and outer faces 391, 392 as shown in FIG. 27. Depicted here are wedge ramps, but the design is equally appropriate for ratchets teeth. One of the washers functions as the retainer washer 390 and the other functions as an intermediate washer 490. The two washers of this embodiment, which are in the form of spring washers, are positioned in series and used with a conventional bolt and nut (without ramp structures). The spring deflection of the assembly is a sum of deflections of the two spring washers.

Operation is similar to previously described embodiments, except that the intermediate washer 490 and a traditional threaded fastener 210 replace the threaded fastener with a ramp structure incorporated on it. Although washers 390, 490 are each depicted with double sets of ramp structures (one on each side of the washer), only one ramp structure on each washer will be used for serial engagement as described.

Referring to FIGS. 28 to 31, there is shown a threaded fastener 210 incorporating two identical spring wedge ramp washers, one washer 390 functioning as a retainer washer and the other washer 490 functioning as an intermediate washer. The design equally applies to ratchet teeth. Both the intermediate washer 490 and the retainer washer 390 have two sets of ramp structures 441, 442 and 341, 342 respectively. The ramp structure 441 is located about the central aperture adjacent the inner face 491, while the ramp structure 442 is located about the central aperture adjacent the outer face 492. The ramps 442 interact with the corresponding wedge ramps of the threaded fastener 210, while ramps 342 and the outer face 392 of the retainer washer 390 fit snugly into ramps 441 and the inner face 491 of the intermediate washer 490 preventing relative rotation between the intermediate washer and the retainer washer. The intermediate and retainer washers act effectively as two spring washers in parallel, doubling the deflection force. It should be understood that two or more spring washers might be employed, with the spring washers arranged in any combination involving series or parallel relationship.

FIGS. 32 to 36 relate to a threaded fastener assembly 100 comprising a threaded fastener 210 in the form of a nut, an intermediate washer 490 and a retainer washer 390. Alternatively, a bolt 290 as illustrated in FIG. 37 can substitute for the nut 210. The fasteners are depicted with double-hex configuration on their outer periphery 213. 493, although hexagonal and other tool engaging shapes are equally possible, while inner radial periphery 494 of the intermediate washer is always circular.

The intermediate washer 490 has two sets of ramps 442, 441 which interact with corresponding sets of ramps 240, 340 on the threaded fastener 210 and the retainer washer 390.

The set of ratchet ramps 441 on the intermediate washer 490 protrudes into the dished set of ratchet ramps 340 on the retainer washer 390. The other side of the retainer washer 390 is provided with an undercut section 397, which defines an annular engaging face 396 in the fashion of the first embodiment. The relative positioning of the ratchet ramps 340, 441 is such that they are at or about the same radial distance from the axis of rotation of the nut 210 as wedge ramps 442,240. Typically, the ratchet ramps 340, 441 have a locking configuration, which is in reverse to that of the wedge ramp structure 442 and 240 on the intermediate washer 490 and the nut 210. The purpose of the retainer washer 390 is to frictionally engage the work-piece so as to allow smooth and effortless operation of the nut 210 and intermediate washer 490 on tightening of the threaded fastener and affording protection for the surface of the work-piece in which it is in contact.

The fact that the ratchets will undergo some flattening during preloading should be taken into consideration during manufacturing. Where the washers are manufactured by a punching operation, sufficient material should be provided so that ratchets are hardened as required during the punching operation. Additional hardening could be achieved during preloading. Where the washers are manufactured by a cutting operation, the design should provide a ratchet shape which after flattening during preloading has sufficient ratchet height to prevent fastener rotation against the ratchets. The design could be improved by increasing height of the ratchets towards fastener axis where loads are the greatest.

It must be understood that similar intermediate washer with dished ratchet set and protruding wedge set can be built to display similar operational qualities when assembled with a washer of the first embodiment and a nut of the fourth embodiment.

It should be noted that the contact between the threaded fastener 210 and the intermediate washer 490, as well as between the intermediate washer 490 and the retainer washer 390, is solely through the interacting ramps 240, 442 and 441, 340 respectively.

Figure 41:
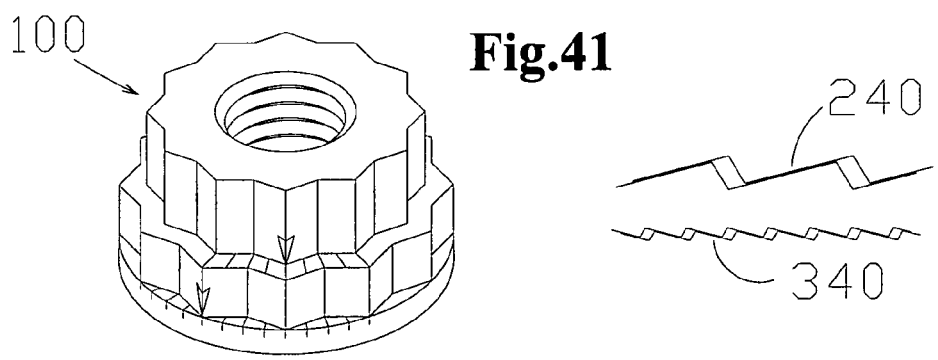
FIG. 41 is a perspective view of the threaded fastener assembly of FIG. 39 in a third operational position.
Figure 42:
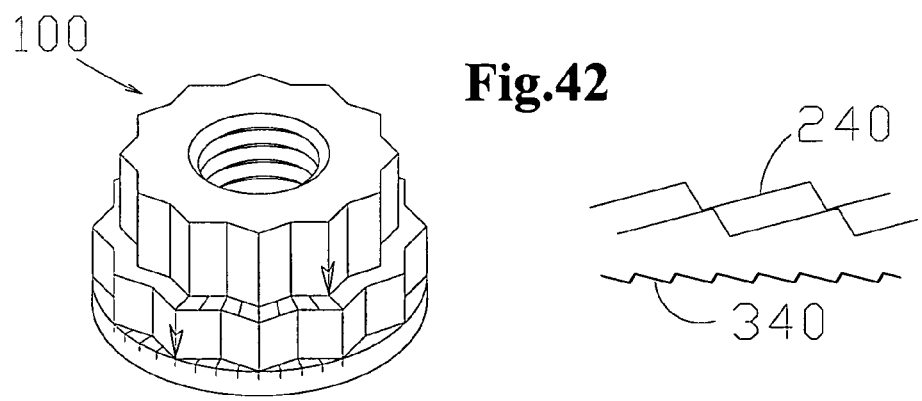
FIG. 42 is a perspective view of the threaded fastener assembly of FIG. 39 in a fourth operational position.

FIGS. 39 to 42 illustrate a threaded fastener assembly 100 incorporating an intermediate washer 490 and a retainer washer 390 of the type employed in the previous embodiment. The assembly 100 is similar to the previous embodiment, except that the intermediate washer 490 is of larger diameter and a visual indication of the extent to which the threaded fastener assembly is loaded is provided. The threaded fastener assembly 100 is illustrated in four operating positions that start after initial threading engagement, as shown sequentially in the four views. The first position, which is shown in FIG. 39, has threaded fastener 210 engaged with the intermediate washer 490 via wedge ramps and intermediate washer engaged with the retainer washer 390 via ratchet ramps. The retainer washer has just established frictional connection with a work-piece Further threading on of the fastener 210 continues while the intermediate washer 490 rides over the ratchet ramps interacting between the intermediate washer and the retainer washer until a desired preload is reached as illustrated in the second position depicted in FIG. 40. The preload is determined in accordance with a scale described later. If further adjustment of the loading is desired, it could be achieved at this point with little effort by a wrench engaging the intermediate washer 490 and driving it further in the threading on direction. Loading now takes place on wedge ramps and not on the thread, while being prevented from backing off by ratchet ramps. A third position depicted in FIG. 41, shows additional loading achieved in this manner. FIG. 42 illustrates the fourth position where the threaded fastener 210 was turned in the unscrewing direction under an influence such as dynamic forces arising from vibration, and loosening on the thread was offset by further tightening between the ramp structure on the threaded fastener and the interacting ramp structure on the intermediate washer 490. In such a dynamic environment, the nut will be turned in both directions and when any slack occurs in the assembly it will be eliminated automatically through the travel on the ratchet teeth. The nut 210 has a pointer 260 which operates in association with a scale 450 on the intermediate washer 490 thereby to provide the visual indication of loading. Similarly, the intermediate washer 490 has a pointer 460, which operates in association with a scale 350 on the retainer washer 390. The total loading of the threaded fastener assembly 100 at any operational position can be displayed on the scales. The threaded fastener assembly 100 is released simply by rotating intermediate member 490 in a counter clockwise direction to primarily release the wedge loading and later unthread the nut.

For fastener removal purposes, where one tool engages two parts of the assembly, a size adaptor 500 (as shown on FIG. 38) is provided. The size adaptor 500 is arranged with its inner radial periphery 594 to fit onto the nut 210 to enable a tool to turn the nut and the intermediate washer in unison by engaging both the intermediate washer and the radial outer periphery 593 of the size adapter. Constructing the nut 210 with an outer periphery of a different size than the outer periphery of the intermediate washer 490 allows tool engagement with separate pieces of the assembly. It can also serve as a security feature as different size and shape tools would otherwise need to be used for tightening and removal of the fastener assembly.

Referring now to FIGS. 43 to 48, there is shown a threaded fastener assembly 100 that includes a threaded fastener 210 and a retainer washer 390. The washer 390 incorporates wedge ramps and a scale is similar to plain retainer washers of previous embodiments, as well as provision to grip the washer for manual operation as will be explained later.

As best seen in FIGS. 44 and 47, there is a provision for a mechanical connection between the nut 210 and the retainer washer 390. The provision comprises a wedge ramp structure 240 formed integrally with the nut 210 and an interacting section ramp structure 340 formed integrally with the retainer washer 390. As was the case in the earlier embodiments, the retainer washer has an inner face 391 with an undercut section providing a central recess 397 surrounded by an annular engaging face 396. The annular engaging face 396 is spaced along the radius further from the axis of rotation of the nut 210 than is the mechanical connection provided by the interacting ramp structures 240, 340. The nut 210 and wedge washer 390 are assembled as a unit and retained in that condition by way of a plain conventional washer 890. While the washer 890 retains the nut 210 the retainer washer 390 in the assembled condition, it does allow limited axial movement and free relative rotation.

A scale 350 is provided to allow a visual indication of the amount of load imposed on the threaded fastener assembly 100 through the wedging action of the interacting ramp structures 240, 340.

The threaded fastener assembly 100 incorporates a gripping means 270 in the form of a plastic grip, which is connected to the nut 210 to allow rotation of the nut by hand. Similarly a further gripping means 370 in the form of plastic grip is provided to operate the retainer washer 390. This is particularly useful as it allows the threaded fastener assembly to be tightened and released manually without requiring use of tools.

A particular application of the threaded fastener assembly 100 of this embodiment is for securing a grinding disk onto the drive spindle of a power tool such as an angle grinder. The grinding disk would be clamped between a back flange joined integrally with the spindle of the power tool and the inner face 391 on the retainer washer. In such applications, it is possible for the rise angle of the sloping faces 345 to be less than the lead angle of the spindle thread. The appropriate selection of the rise angle ensures motor tightening of the threaded fastener assembly through interaction of the ramp structures rather than on the thread of the nut 210. In a typical installation, the nut 210 is screwed onto the, thread of the spindle and secured tightly through manual operation of the grip 270. The abutment faces 246, 346 of the ramp sections in the two ramp structures convey the tightening torque. Upon operation of the motor, the ramp structure 240 on the nut is caused to ride on the ramps 340 of the retainer washer 390. The fully loaded position is depicted on FIGS. 46 to 48. Provided that the threaded fastener assembly 100 was properly tightened prior to operation of the motor, very little or no further tightening on the thread occurs. Upon a sudden stop of the motor, the inertia of the disc will cause the ramp structure 240 on the nut 210 to ride down the ramp structure 340 on the retainer washer 390 and release tension in the connection. On the other hand, upon stopping of the motor in a slow and controlled fashion, the tension in the connection is not released but the amount of torque required to turn a nut with a spindle rotating freely down the ramps is within possibilities of manual operation. Consequently turning the grip 370 of the retainer washer 390 in thread unscrewing direction will allow disassembly.

It happens on occasion that as a consequence of a sudden stop a conventional locking nut can detach from the shaft with which it is engaged and in so doing allow the disc to separate from the drive spindle together with the disc. The threaded fastener assembly 100 of FIGS. 49 to 59 seeks to prevent such detachment. The assembly 100 utilizes an intermediate washer 490 and a retainer washer 390 incorporating gripping means 270 and 470 for manual operation. The assembly 100 is shown in its initial position in FIGS. 49 to 51. The threaded fastener 210 in the form of a nut, the intermediate washer 490 and the retainer washer 390 are fitted together and retained as a unit, in a similar fashion to the previous embodiment. This assembly would be much easier to secure manually than a two-piece, as only fraction of the torque is required for turning the nut on a lesser radius along the ratchets.

FIGS. 52 to 60 illustrate subsequent operational positions equivalent to these described with relation to FIGS. 39 to 42. FIG. 57 shows the position of sloping faces 245, 345, 445 and abutment faces 246, 346, 446.

The safety feature of this assembly can best be described with relation to FIG. 60 which shows schematically the relative position of ramps during steady motor operation of the power tool. At a sudden stop condition of the motor, the disc will still tend to turn with the retainer washer, but the ratchet connection ensures that the intermediate member with the nut is not torque in the unscrewing direction. Excellent operational capabilities could also be achieved for the same application when intermediate washer of this embodiment is flipped; that is, the ratchet connection appear between it and the nut.

It should be understood that scales can be employed on all previously described embodiments.

Any threaded fastener assembly utilising ratchet teeth is particularly suitable for the implementation of a scale to provide a visual indication during pre-loading.

The use of ratchet teeth has two advantages. It allows effortless tightening of the assembly and automatically aligns the pointer 260 on the nut with the beginning of the scale 350. Human error is thus eliminated for angle controlled tightening to achieve 'finger tight' position.

A particular advantage of the threaded fastener assemblies according to the invention is that they can be positioned in an array and a common tool employed to operate the fasteners in unison. Such an arrangement for a circular array is illustrated in FIGS. 61 and 62 of the drawings.

Figure 61:
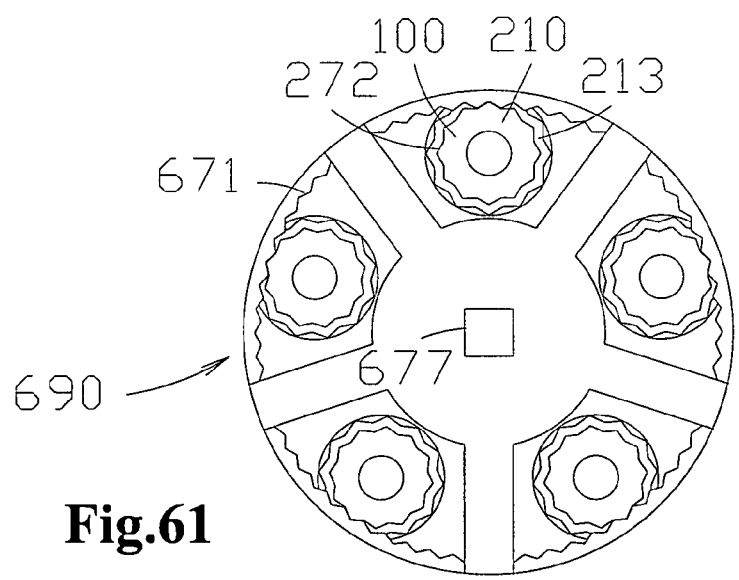
FIG. 61 is a view of a loading structure for use in operating a circular array of threaded fastener assemblies.

Referring in particular to FIG. 61, there is shown a series of five bolted assemblies 100 which are positioned in a circular array and which employ washers according to the invention. The threaded fasteners 210 have an along the radius outer periphery 213 equipped with engaging means 272 configured to mate with engaging means 671 located on the internal wall of the loading structure. The loading structure 690 is fitted around the array. The loading structure 690 has a recess 677 for receiving a wrenching tool (not shown). Turning the loading structure with the aid of the wrenching tool engaged in the recess 677 allows operation of the various threaded fastener assemblies 100 in unison.

Figure 62:
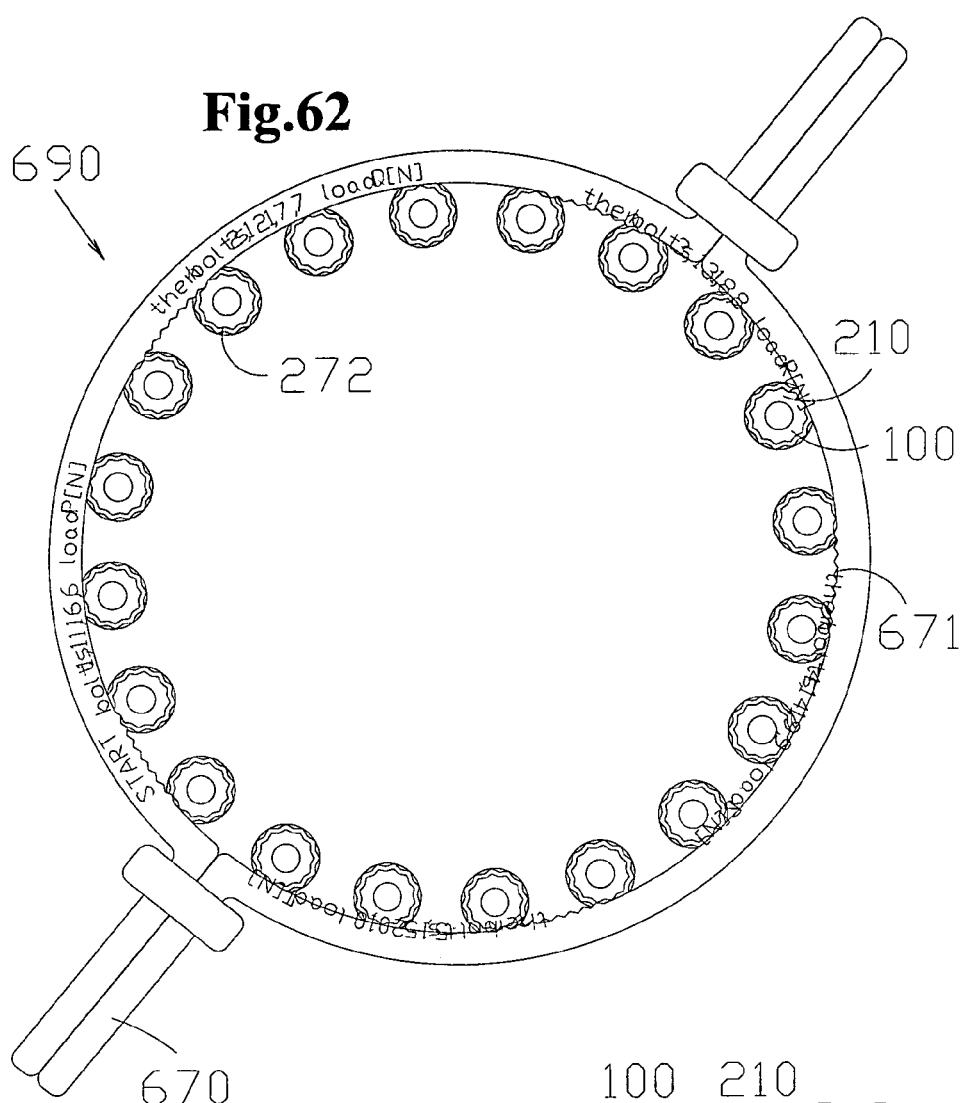
FIG. 62 is a view of an alternative loading structure for use in operating a circular array of threaded fastener assemblies.

Referring now to FIG. 62 of the drawings, there is illustrated a similar arrangement with the exception that there is provided a loading structure 690 formed with engaging surface 671 which operate a number of threaded fastener assemblies 100 upon rotation of the tool equipped with handles 670.

Loading several fastener assemblies in unison that is possible with the use of the loading structure 690 and low tightening torque fastener assemblies 100 is further enhanced by the amount of required preload printed on the structure for each set of five fastener assemblies. Similar to scales on individual fasteners, the printing could be in a form of sticky labels.

The amount of calculated preload could be printed on a loading structure for one or more passes and may be different for applications with or without gaskets. Although the embodiments of FIGS. 61 and 62 are depicted with fastener assemblies in a circular array, the invention is not limited to circular arrays.

The array loading techniques currently in uses including incremental tightening and Van Campen's matrix could be applied in conjunction with equipment according to the present invention.

Consequently it has been envisaged a precision loading of arrays that makes use of this invention to be extended to include installations lesser than critical.

Unlike many prior art fastener devices, the threaded fastener assemblies that incorporate washers according to the present invention use most of the tightening torque as preload on the assembly.

Loading the fastener assembly on the ramp structures can eliminate unknown friction between the fastener assembly and the work-piece. It would be advantageous to lower the frictional coefficient between the ramp structures by use of lubricants and other techniques. It is believed that such arrangements that accompany special geometry that characterize the washers of this invention may allow the same preload to be achieved with only about 20% of torque required as compared to prior art fasteners. Such a reduction of tightening torque allows operation of the threaded fastening assemblies without external tools, or simultaneous tightening of a circular array of fasteners as described.

It should be appreciated that the scope of the invention is not limited to the scope of the particular embodiments described. While various features of the invention have been introduced in relation to the description and drawings of particular embodiments, it should be understood that those features needed not be limited to those particular embodiments. Features of the invention can be in any combination as may be appropriate on any threaded fastener assembly employing washers according to the invention.

The threaded fastener assemblies employing washers according to the present invention aim to address at least some of the deficiencies of the present art. It is believed that threaded fastener assemblies incorporating washers according to the invention exhibit superiority in areas of safety, reliability and maintainability is due to a combination of the following advantages:

(1) Dramatically improved accuracy of preloading with the use of enhanced angle controlled tightening;
(2) Counteracting elevated and differential temperature effect and creep and importantly not contributing towards it with the use of improved conical spring washers;
(3) Counteracting off-torque by wedging action;
(4) Dynamic and elastic behaviour of the fastener contributes substantially to its ability to hold, add and release preload automatically and as required, according to the environmental conditions of the joint;
(5) Ease of accurate loading with incorporation of the scale;
(6) Effortless loading with reduction of required torque and use of friction reducing techniques;
(7) Reduction or elimination of galling, sizing and gouging of most of the abutting surfaces;
(8) Self-centering characteristic allows a reduction in bolt size for a prescribed external load and negligible residual torque after loading;
(9) The capacity for manual operation due to reduced torque requirement;
(10) The ability of unison loading of multi-fastener assemblies beneficiary of the reduced torque;
(11) Thread striping prevention due to even load distribution along the threads;
(12) Elimination of hoop spreading due to conical force transfer surface;
(13) Prevents over-tightening of the disc o as power tool due to loading on wedges rather than on threads;
(14) Prevents unintentional detachment of the disc of a powertool in the event of a sudden halt of the motor in powertools due to ratchet action;
(15) Allows manual attachment and detachment of the disc of a powertool as it utilizes motor action for both tightening and release on wedges;
(16) Can be produced from commonly used materials for both plain washers and spring washers;
(17) All the common methods used for the production of known washers can be utilised.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A spring action joint having at least two parts comprising,
    a threaded part having a body with two opposed sides and a circular series of ramp structures on at least one of the two opposed sides, and
    a first washer having a body with two opposed sides, an outer periphery, a central aperture, and a circular series of ramp structures in the form of ratchet teeth on at least one of the two opposed sides of the first washer, the body of the washer being resiliently deformable at least up to when it is subjected to a joint preloading force created by tightening the joint up to a preloaded state,
    a ratchet mechanism including the ratchet teeth, the ratchet mechanism allows relative movement between the joint parts in a direction which causes tightening of the spring action joint but resists movement in the opposite direction,
    wherein the joint has an engaging zone for applying the preloading force to a work-piece, the engaging zone being disposed on or adjacent to an outer periphery of substantially concave shaped surface.

2. The spring action joint according to claim 1, wherein the first washer deforms elastically under a working load.

3. The spring action joint according to claim 1, further including a second washer having two opposed sides, an outer periphery, a central aperture, and a circular series of ramp structures.

4. The spring action joint according to claim 3, wherein the ramp structures of the second washer are in a form of ratchets.

5. The spring action joint according to claim 3, wherein the circular series of ramp structures of the second washer are in a form of wedges.

6. The spring action joint according to claim 3, wherein one of the opposed sides of the second washer includes the circular series ramp structures which are in a form of wedges, and the other side includes circular series of ramp structures in a form of ratchets.

7. The spring action joint according to claim 1, wherein the engaging zone lacks work-piece embedding protrusions.

8. The spring action joint according to claim 3, wherein the second washer is positioned between one of the opposed sides of threaded part and one of the opposed sides of the first washer.

9. The spring action joint according to claim 1, wherein the surface which incorporates the ratchet teeth of the first washer has a shape based on at least one of a frustum, part of a sphere, or a combination of these shapes.

10. The spring action joint according to claim 3, wherein the surface which incorporates the circular series of ramp structures of the second washer has a shape based on at least one of a frustum, part of a sphere, or a combination of these shapes.

11. The spring action joint according to claim 1, wherein the ramp structures of the first washer are positioned at a distance from a center of rotation, such that resultant forces loading the assembly transferred through the ramps act on a smallest torque arm.

12. The spring action joint according to claim 3, wherein the ramp structures of both washers are positioned at a distance from a center of rotation, such that resultant forces loading the assembly transferred through the ramps act on a smallest torque arm.

13. The spring action joint according to claim 1, wherein a torque conveyed through the engaging zone is larger than a torque transmitted through the ramp structures of the first washer.

14. The spring action joint according to claim 1, wherein the first washer is of such a stiffness that allows full loading of the joint without the washer being fully flattened.

15. The spring action joint according to claim 1, where the parts are situated to include a first position having an initial central and liner alignment of ramp structures, followed by a second position where the first washer is subjected to resilient deflection which causes an increased engagement between the threaded part and the first washer such that an inner peripheral portion of the first washer folded towards the ramp structures of the threaded part.

16. The spring action joint according to claim 1, wherein the threaded part has one of a scale and a pointer, and the first washer has the other of the scale and the pointer.

17. The spring action joint according to claim 3, wherein the second washer has one of a scale and a pointer, and the first washer has the other of the scale and the pointer.

18. The spring action joint according to claim 3, wherein the threaded part has one of a first scale and a first pointer, and the second washer has the other of the first scale and the first pointer, and the second washer has one of a second scale and a second pointer, and the first washer has the other of the second scale and the second pointer.

19. The spring action joint according to claim 16, wherein the ratchet teeth are disposed to automatically align the pointer with a beginning of the scale.

20. The spring action joint according to claim 17, wherein the ratchet teeth are disposed to automatically align the pointer with a beginning of the scale.

21. The spring action joint according to claim 18, wherein the ratchet teeth are disposed to automatically align the pointer with a beginning of the scale.

22. The spring action joint according to claim 3, having automatic scale alignment.

23. The spring action joint according to claim 1, further including a means for manually gripping and loading the spring joint without use of tools.

24. The spring action joint according to claim 23, wherein the means for manually gripping comprises a plurality of radially extending protrusions.

25. The spring action joint according to claim 3, wherein the circular series of ramps of the second washer are in a form of wedges with inclined planes, which are angled in a direction of a thread of the threaded part and have a pitch bigger than a pitch of the thread, so as to cause wedging of the thread during unscrewing.

26. The spring action joint according to claim 1, wherein the threaded part is permitted to rotate by an application of torque in a screwing on direction and is subject to resistance in a screwing off direction due to a force applied by the ratchet teeth which is transferred to the threaded part.

27. The spring action joint according to claim 1, wherein the ratchet teeth of the first washer mate with the ramp structures of the threaded part.

28. The spring action joint according to claim 3, wherein the ratchet teeth of the first washer mate with the ramp structure of the second washer.

29. The spring action joint according to claim 1, wherein the threaded part includes a threaded shank.

30. The spring action joint according to claim 3, wherein the threaded part includes a threaded shank.

31. The spring action joint according to claim 1, wherein the ramp structures of the first washer are located closer to the central axis of the spring action joint than the engaging zone.

32. The spring action joint according to claim 3, wherein the ramp structures of the second washer are located closer to the central axis of the spring action joint than the engaging zone.

33. The spring action joint according to claim 3, further including a means for manually gripping and loading the spring joint without use of tools.

34. The spring action joint according to claim 33, wherein the means for manually gripping comprises a plurality of radially extending protrusions.

35. A washer, comprising:
a body with two opposed sides;
an outer periphery;
a central aperture; and
a circular series of ramp structures in the form of ratchet teeth on at least one of the two opposed sides, the ratchet teeth being arranged to cooperate with a complementary set of ratchet teeth on an adjacent joint part to form a ratchet mechanism, which allows relative movement between the joint parts in a direction which causes tightening of the joint but resists movement in the opposite direction,
wherein the body of the washer is resiliently deformable at least up to when it is subjected to a joint preloading force created by tightening the joint up to a preloaded state.

36. The washer according to claim 35, wherein the washer deforms elastically under a working load.

37. The washer according to claim 35, wherein the surface which incorporates the ratchet teeth of the washer has a shape based on at least one of a frustum, part of a sphere, or a combination of these shapes.

38. The washer according to claim 35, wherein the ramp structures of the washer are positioned at a distance from a center of rotation, such that resultant forces loading the assembly transferred through the ramps act on a smallest torque arm.

39. The washer according to claim 35, wherein the washer forms part of a joint, and the washer is of such a stiffness that allows full loading of the joint without the washer being fully flattened.

40. The washer according to claim 35, wherein the other of the at least one of the two opposed sides of the washer includes circular series of ramp structures which are in a form of wedges.

41. The washer according to claim 35, wherein the washer has one of a scale and a pointer.

42. The washer according to claim 35, wherein the ratchet teeth are located on an inner radial periphery of the at least one of the two opposed sides.

* * * * *